United States Patent
Kim et al.

(10) Patent No.: US 11,875,916 B2
(45) Date of Patent: Jan. 16, 2024

(54) METHOD FOR MANUFACTURING A PIPE TYPE BUSBAR AND A PIPE TYPE BUSBAR

(71) Applicants: HYUNDAI MOTOR COMPANY, Seoul (KR); KIA CORPORATION, Seoul (KR); A.F.W. CO., LTD., Waegwan-eup (KR)

(72) Inventors: Byong-Soo Kim, Uiwang-si (KR); Jae-Sun Lim, Seoul (KR); Ki-Young Kim, Daegu (KR); Jong-Duk Seo, Daegu (KR)

(73) Assignees: HYUNDAI MOTOR COMPANY, Seoul (KR); KIA CORPORATION, Seoul (KR); A.F.W. CO., LTD., Waegwan-eup (KR)

( * ) Notice: Subject to any disclaimer, the term of this patent is extended or adjusted under 35 U.S.C. 154(b) by 0 days.

(21) Appl. No.: 17/685,107

(22) Filed: Mar. 2, 2022

(65) Prior Publication Data
US 2023/0197318 A1 Jun. 22, 2023

(30) Foreign Application Priority Data
Dec. 16, 2021 (KR) .......... 10-2021-0180831

(51) Int. Cl.
*H01B 1/02* (2006.01)
*H01B 13/00* (2006.01)
*H02G 5/00* (2006.01)

(52) U.S. Cl.
CPC ......... *H01B 13/0036* (2013.01); *H02G 5/007* (2013.01); *H01B 1/02* (2013.01)

(58) Field of Classification Search
CPC ...... H01R 1/023; H01R 4/021; H01R 4/5033; H01R 4/206; H01R 4/625; H01R 43/048; H01R 43/0214; H01B 1/02; H01B 1/04; H01B 13/0036

USPC .................. 174/74 R, 84 R, 88 C
See application file for complete search history.

(56) References Cited

U.S. PATENT DOCUMENTS

| | | | | |
|---|---|---|---|---|
| 5,442,846 | A | * | 8/1995 | Snaper .............. F16L 13/14 29/458 |
| 5,813,264 | A | * | 9/1998 | Steingroever ........ B21D 26/14 72/62 |
| 6,405,761 | B1 | * | 6/2002 | Shimizu .............. B23K 20/00 138/155 |

(Continued)

FOREIGN PATENT DOCUMENTS

| CN | 207753204 U | * | 1/2018 | ............ H01R 13/02 |
|---|---|---|---|---|
| KR | 100977089 B1 | | 8/2010 | |

(Continued)

OTHER PUBLICATIONS

Office Action cited in corresponding Korean patent application No. 10-2021-0180831; dated Aug. 29, 2023; 8 pp.

*Primary Examiner* — William H. Mayo, III
(74) *Attorney, Agent, or Firm* — LEMPIA SUMMERFIELD KATZ LLC

(57) ABSTRACT

A method for manufacturing a pipe type busbar includes: preparing a first tubular member made of a first material having a hollow formed therein; preparing a second tubular member having a hollow formed therein and made of a second material different from the first material; plating the first tubular member with a third material; and bonding one surface of the first tubular member and one surface of the second tubular member.

8 Claims, 4 Drawing Sheets

(56) References Cited

U.S. PATENT DOCUMENTS

2017/0229793 A1* 8/2017 Schmidt ................. H01R 4/206
2022/0072652 A1* 3/2022 Kim ................... H01R 43/0214

FOREIGN PATENT DOCUMENTS

| KR | 101041182 B1 | 6/2011 | | |
|----|--------------|--------|---|---|
| KR | 20170044738 A | 4/2017 | | |
| KR | 101844270 B1 | 4/2018 | | |
| KR | 101931320 B1 | 12/2018 | | |
| NZ | WO 2012/161594 A1 * | 11/2012 | ............. | B23K 20/12 |

* cited by examiner

FIG. 1 - Prior Art
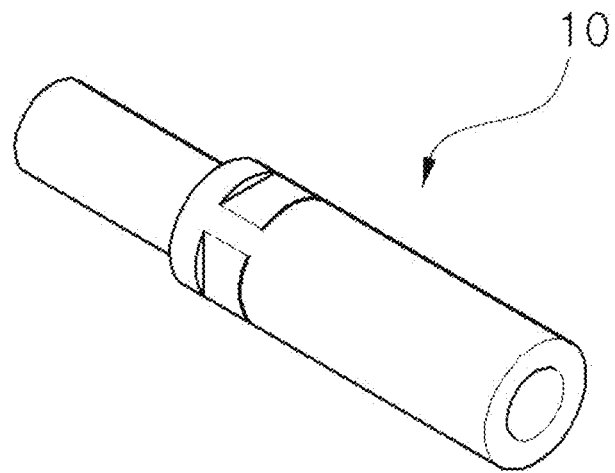
FIG. 2
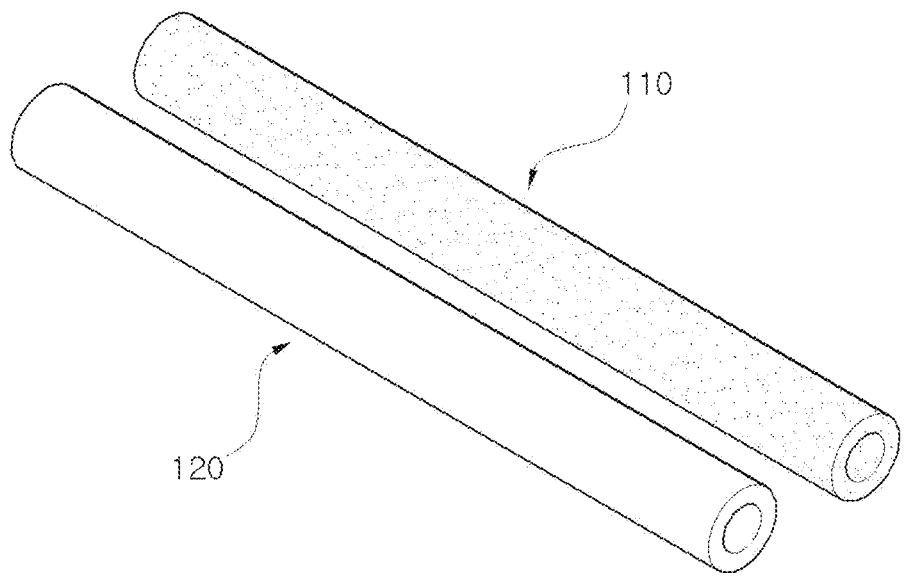

METHOD FOR MANUFACTURING A PIPE TYPE BUSBAR AND A PIPE TYPE BUSBAR

CROSS-REFERENCE TO RELATED APPLICATION

This application claims priority to Korean Patent Application No. 10-2021-0180831, filed on Dec. 16, 2021, which is incorporated herein by reference in its entirety.

BACKGROUND OF THE DISCLOSURE

Field of the Disclosure

The present disclosure relates to a busbar, and in particular, to a method for manufacturing a pipe type busbar and the busbar manufactured by the method.

Description of Related Art

A busbar is a medium that delivers electrical energy and that can deliver more current than a cable with the same cross-sectional area. Therefore, the busbar is used as a key component of some high-voltage connections to an electric vehicle (EV), etc. or an electrical architecture of a future vehicle.

In other words, with an increase in an eco-friendly vehicle such as EV/FCEV, an increase in electric components is a trend in developing a vehicle. Therefore, the application of a busbar is also increased, and its shape or type also becomes diversified.

In particular, as high-power meter components are integrated and highly efficient, a plug type connection is attracting attention among busbar connection methods.

Currently, a plug-type busbar is applied by plating a rod-shaped busbar.

FIG. 1 shows a conventional rod-shaped busbar 10, in which a rod type copper (Cu) material is machined. Plating is then performed as a post-machining process.

Therefore, all of the exposed outer surfaces are made of a plating material. since a copper material is entirely used, it is inevitably disadvantageous in terms of a weight and a cost despite the increase in the range of application to the vehicle.

The contents described in the Description of Related Art section are to help understand the background of the present disclosure. The contents may include what is not previously known to those having ordinary skill in the art to which the present disclosure pertains.

SUMMARY OF THE DISCLOSURE

The present disclosure has been made in efforts to solve the above problems associated with the related art. An object of the present disclosure is to provide a method for manufacturing a pipe type busbar and to provide a pipe type busbar having the feature in which it is possible to reduce a weight, and a cost by a heterogeneous material, has a pipe shape, and has a part of a copper material, that may be exposed.

A method for manufacturing a pipe type busbar according to one aspect of the present disclosure includes: preparing a first tubular member made of a first material having a hollow formed therein; preparing a second tubular member having a hollow formed therein and made of a second material different from the first material; plating the first tubular member with a third material; and bonding one surface of the first tubular member and one surface of the second tubular member.

In addition, the bonding of one surface of the first tubular member and one surface of the second tubular member may bond one surface of the first tubular member and one surface of the second tubular member by rotary friction welding (RFW).

Here, the first material may be copper (Cu), the second material may be aluminum (Al), and the third material may be silver (Ag).

In addition, the preparation of the first tubular member may include cutting and machining the first tubular member. The preparation of the second tubular member may include cutting the second tubular member.

In addition, the cutting and machining of the first tubular member may include machining the first tubular member to form a stepped part so that a diameter of the other surface of the first tubular member is smaller than a diameter of one surface thereof.

In addition, the diameter of one surface of the first tubular member and a diameter of one surface of the second tubular member may be the same.

Furthermore, the method may further include machining a welding part formed between the one surface of the first tubular member and the one surface of the second tubular member by the rotary friction welding.

In addition, the method may further include machining an outer surface of an area having a larger diameter than the stepped part of the first tubular member.

In addition, the third material may be removed. Therefore, the first material of the first tubular member may be exposed by the machining of the outer surface of the area having the larger diameter than the stepped part of the first tubular member.

In addition, the method may further include degreasing the pipe type busbar that is completely machined.

In addition, the first material may be copper (Cu), the second material may be aluminum (Al), and the third material may be silver (Ag).

Next, a pipe type busbar, according to one aspect of the present disclosure, includes: a first tubular member having one end made of a first material and a second tubular member made of a second material different than the first material. The one end of the first tubular member and the one end of the second tubular member are bonded by a rotary friction welding (RFW) and have a hollow formed in the longitudinal direction.

In addition, another end of the first tubular member may be formed as a stepped part having a smaller diameter than that of one end thereof. The stepped part may be formed by plating a third material different from the first material on the first material.

Here, the first material may be copper (Cu), the second material may be aluminum (Al), and the third material may be silver (Ag).

According to the manufacturing method and the pipe type busbar according to the present disclosure, the busbar can be made of the heterogeneous material and formed of the hollow pipe type, thereby reducing the weight by about 30% compared to the conventional rod-shaped busbar and reducing the cost.

BRIEF DESCRIPTION OF THE DRAWINGS

FIG. 1 shows a conventional rod-shaped busbar.

FIGS. 2-8 sequentially show a process of manufacturing a pipe type busbar according to the present disclosure.

DESCRIPTION OF SPECIFIC EMBODIMENTS

To fully understand the present disclosure, the operational advantages of the present disclosure, and the objects achieved by practicing the present disclosure, reference should be made to the accompanying drawings showing embodiments of the present disclosure and the contents described in the accompanying drawings.

In describing embodiments of the present disclosure, well-known technologies or repetitive descriptions that can unnecessarily obscure the gist of the present disclosure have been reduced or omitted.

FIGS. 2-8 sequentially show a process of manufacturing a pipe type busbar according to the present disclosure.

Hereinafter, a method for manufacturing a pipe type busbar, and the pipe type busbar, according to an embodiment of the present disclosure is described with reference to FIGS. 2-8.

The present disclosure is intended to reduce a weight and a cost of a busbar through a heterogeneous material other than a single copper material, and to also reduce the weight and the cost by manufacturing a pipe type busbar, unlike the conventional rod type busbar.

First, as shown in FIG. 2, a first tubular member 110 and a second tubular member 120 are prepared.

In other words, the first tubular member 110 and the second tubular member 120 are prepared and are or have a hollow, respectively. A first material of the first tubular member, according to the embodiment of the present disclosure, is a copper (Cu) material, and the first tubular member 110 is provided as a copper pipe. A second material of the second tubular member is an aluminum (Al) material, and the second tubular member 120 is provided as an aluminum pipe.

Figure 3:
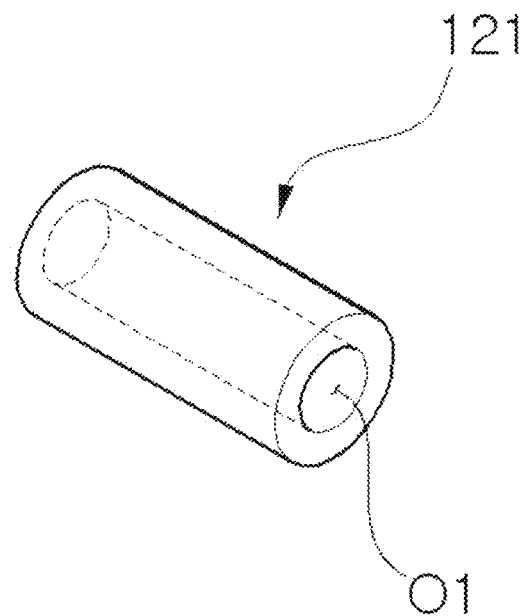

As shown in FIG. 3, the second tubular member 120 is cut to fit the specification, i.e., size, of the busbar in order to prepare the cut second pipe type material 121. It can be seen that a first hollow O1 is formed.

Figure 4:
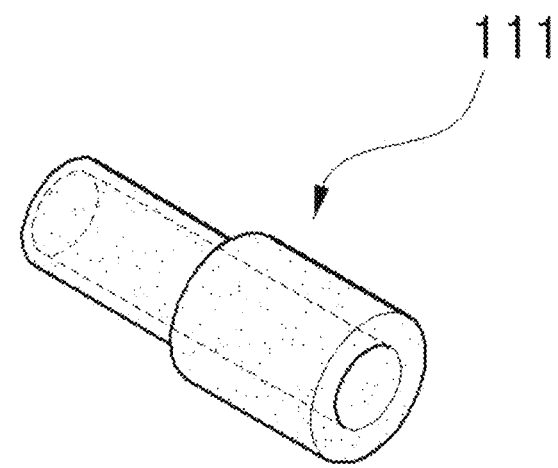
Figure 5:
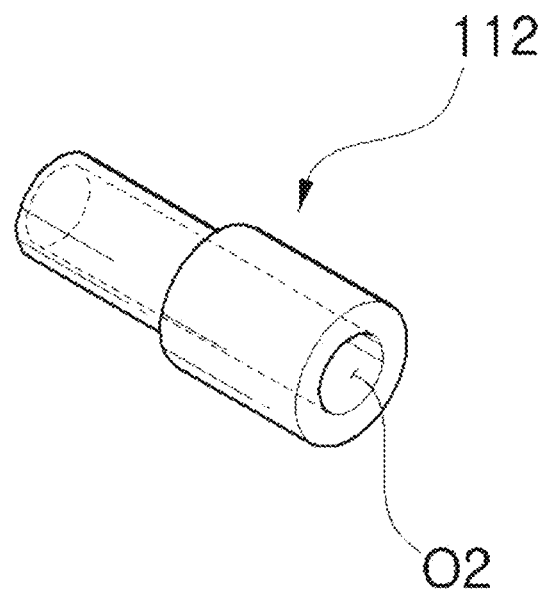

In addition, as shown in FIG. 4, the first tubular member 110 is cut to fit the specification, i.e., size, of the busbar to prepare the machined first pipe type material 111. It can be seen that the first tubular member 110, machined as shown in FIG. 5, also has a hollow O2 formed therein.

As shown, the machined first pipe type material 111, made of the copper material, is machined to be formed with a stepped part 111-1. The machined first pipe type material 111 has a diameter of one end corresponding to a diameter of the cut second pipe type material 121 and a diameter of the other end smaller than that of the one end.

Then, a surface of the machined first pipe type material 111 is plated with a third material. The third material of the plated first pipe type material 112 may be silver (Ag).

One end of the thus prepared plated first pipe type material 112 and one end of the cut second pipe type material 121 are bonded to one another.

According to the present disclosure, the bonding between heterogeneous materials is performed by rotary friction welding (RFW).

The rotary friction welding is a welding method of a solid-state pressure welding manner, which fixes one of the first tubular member and the second tubular member. The method rubs both ends while rotating the other tubular member at high speed and bonds them by applying momentary mechanical pressure when the friction surfaces reach a temperature sufficient for bonding due to friction heat.

Figure 6:
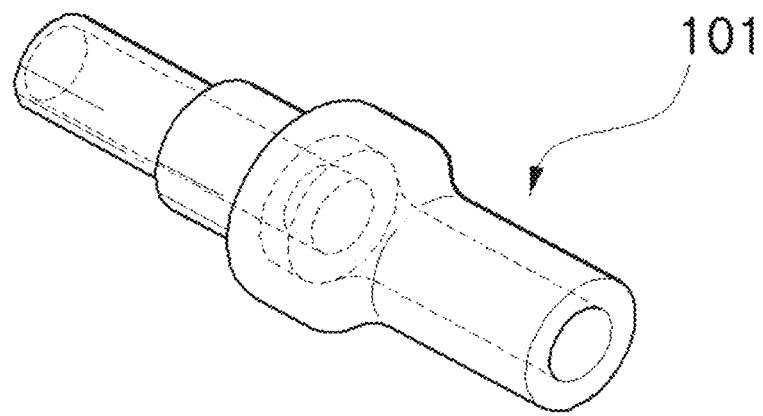
Figure 7:
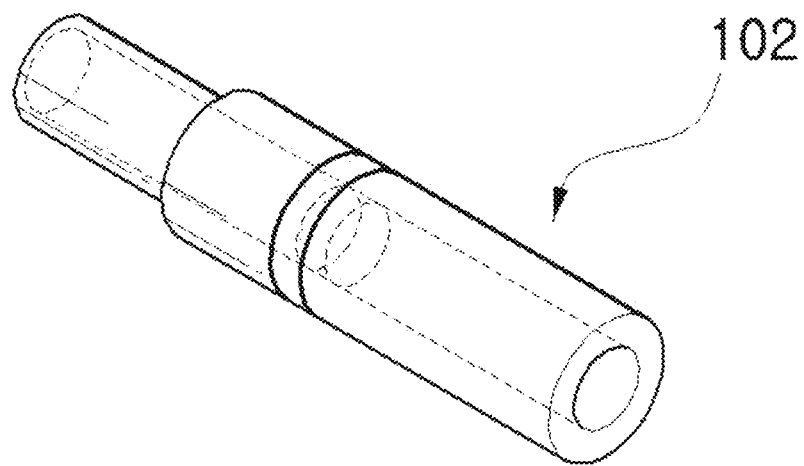

Therefore, the bonded busbar 101 is manufactured as shown in FIG. 6. Further, as shown in FIG. 6, a welded portion is formed to be larger than the diameters of the first tubular member 110 and the second tubular member 120.

Next, a primarily machined busbar 102 is manufactured by machining the welded portion to have the same diameter as the diameters of the first tubular member 110 and the second tubular member 120.

Through this machining, the third material, by plating, is removed, and as shown, a part 100-1 of a first material is exposed.

Figure 8:
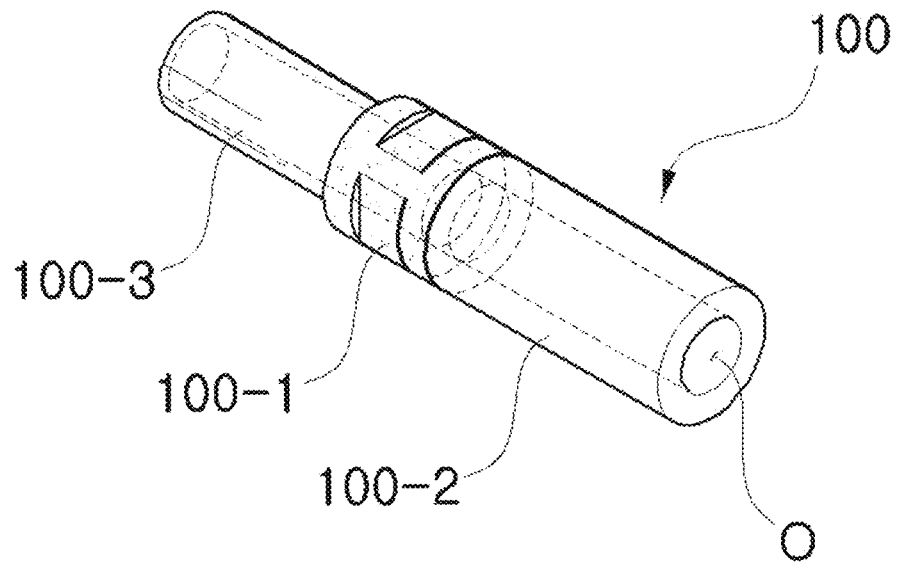

As described above, after the primary machining, as shown in FIG. 8, a secondary machining is performed in the form of the final pipe type busbar 100.

The secondary machining machines the bonded area of the plated first pipe type material 112 so that the third material, by plating, is removed and a shape required for the pipe type busbar is machined.

A groove for insertion into the component to be connected is machined in this machined part.

The busbar 100, completely machined, is degreased to complete manufacturing. The completed busbar 100 may be classified into the first material part 100-1, a second material part 100-2, and a third material part 100-3.

The first material part 100-1 is a machined part made of a copper material i.e., the first material, which is a part inserted into the component to be connected and corresponds to a contact part to require stability.

Therefore, the present disclosure can secure more electrical stability by exposing the copper material to the contact part.

In addition, the second material, part 100-2, can be made of an aluminum material, i.e., the second material, which contributes to reducing the weight. The third material, part 100-3, can be separately made of a silver material, i.e., the third material, thereby implementing the stable connection and being protected from physical damage such as abrasion.

In addition, it is possible to form a hollow (O) penetrating the busbar 100 in the longitudinal direction, thereby reducing the weight and the cost.

As described above, the present disclosure has been described with reference to the illustrative drawings but is not limited to the described embodiments. It should be apparent to those having ordinary skill in the art that various modifications and changes can be made without departing from the spirit and scope of the present disclosure. Therefore, these modifications or changes should be said to belong to the claims of the present disclosure, and the scope of the present disclosure should be interpreted based on the appended claims.

What is claimed is:

1. A method for manufacturing a pipe type busbar, the method comprising:
preparing a first tubular member made of a first material having a hollow formed therein;
preparing a second tubular member having a hollow formed therein and made of a second material different from the first material;
plating the first tubular member with a third material;
bonding one surface of the first tubular member and one surface of the second tubular member to one another;
machining the first tubular member to form a stepped part so that a diameter of another surface of the first tubular member is smaller than a diameter of one surface thereof;
machining an outer surface of an area having a larger diameter than the stepped part of the first tubular member after bonding; and
removing the third material such that the first material of the first tubular member is exposed by the machining of the outer surface of the area having the larger diameter than the stepped part of the first tubular member.

2. The method of claim 1, wherein bonding the one surface of the first tubular member and the one surface of the second tubular member is by rotary friction welding (RFW).

3. The method of claim 2, wherein the first material is copper (Cu), the second material is aluminum (Al), and the third material is silver (Ag).

4. The method of claim 2, wherein preparing the first tubular member comprises cutting and machining the first tubular member, and wherein preparing the second tubular member comprises cutting the second tubular member.

5. The method of claim 1, wherein the diameter of one surface of the first tubular member and a diameter of one surface of the second tubular member are the same.

6. The method of claim 1, further comprising machining a welding part formed between the one surface of the first tubular member and the one surface of the second tubular member by the RFW.

7. The method of claim 1, further comprising degreasing the pipe type busbar completely machined.

8. The method of claim 1, wherein the first material is copper (Cu), the second material is aluminum (Al), and the third material is silver (Ag).

* * * * *